United States Patent [19]

Mulokey et al.

[11] Patent Number: 4,661,914

[45] Date of Patent: Apr. 28, 1987

[54] ENERGY MANAGEMENT CONTROL APPARATUS

[75] Inventors: William P. Mulokey, Washington, D.C.; Peter A. Weisskopf, Fairfax, Va.

[73] Assignee: Magnavox Government and Industrial Electronics Company, Fort Wayne, Ind.

[21] Appl. No.: 618,034

[22] Filed: Jun. 7, 1984

[51] Int. Cl.⁴ .................. G06F 15/20; F28F 28/00; G05D 23/00; F23N 5/20

[52] U.S. Cl. .................................. 364/505; 364/557; 364/493; 165/12; 236/46 R

[58] Field of Search ............ 364/200, 138, 140, 141, 364/145, 493, 505, 557, 900; 165/13, 12, 10; 237/2 B; 236/46 R

[56] References Cited

U.S. PATENT DOCUMENTS

| | | | |
|---|---|---|---|
| 4,153,945 | 5/1979 | Actor et al. | 364/900 |
| 4,167,786 | 9/1979 | Miller et al. | 364/493 |
| 4,209,840 | 6/1980 | Berardi et al. | 364/200 |
| 4,217,646 | 8/1980 | Caltagirone et al. | 364/505 X |
| 4,298,946 | 11/1981 | Hartsell et al. | 364/145 X |
| 4,316,256 | 2/1982 | Hendricks et al. | 364/505 |
| 4,382,544 | 5/1983 | Stewart | 165/12 X |
| 4,423,765 | 1/1984 | Hildebrand | 236/46 R X |
| 4,475,685 | 10/1984 | Grimado et al. | 364/557 X |
| 4,509,585 | 4/1985 | Carney et al. | 165/12 |
| 4,527,247 | 7/1985 | Kaiser et al. | 364/900 X |

Primary Examiner—Gary Chin
Assistant Examiner—Joseph L. Dixon
Attorney, Agent, or Firm—Thomas A. Briody; William J. Streeter; Richard T. Seeger

[57] ABSTRACT

An energy management controller is coupled via a clock line pair, a "data out" line pair and a "data in" line pair, to a plurality or group of stations each having energy using equipment. Each station is electrically coupled to each line pair at spaced points along the line pairs. Each station counts the number of clock bits from the controller. After each group of a predetermined number of clock bits are received, each station provides an address count that is incremented by one after each group of clock bits are received. By setting each station to a different address count and enabling each station to transmit and receive data only during its respective address count period each station can be individually accessed by the controller without specifically addressing each station. During the address count period for each station serial bits are transmitted to and received from that station by the controller for actuation and control of the energy using equipment for that station. Use of the clock line enables each station control to synchronize and therefore communicate with the controller even though the controller has an aperiodic and unpredictable response time between receiving data from and transmitting data to the station controls. Information gathered at each station control is digitized at the station control for transmission to the controller.

16 Claims, 11 Drawing Figures

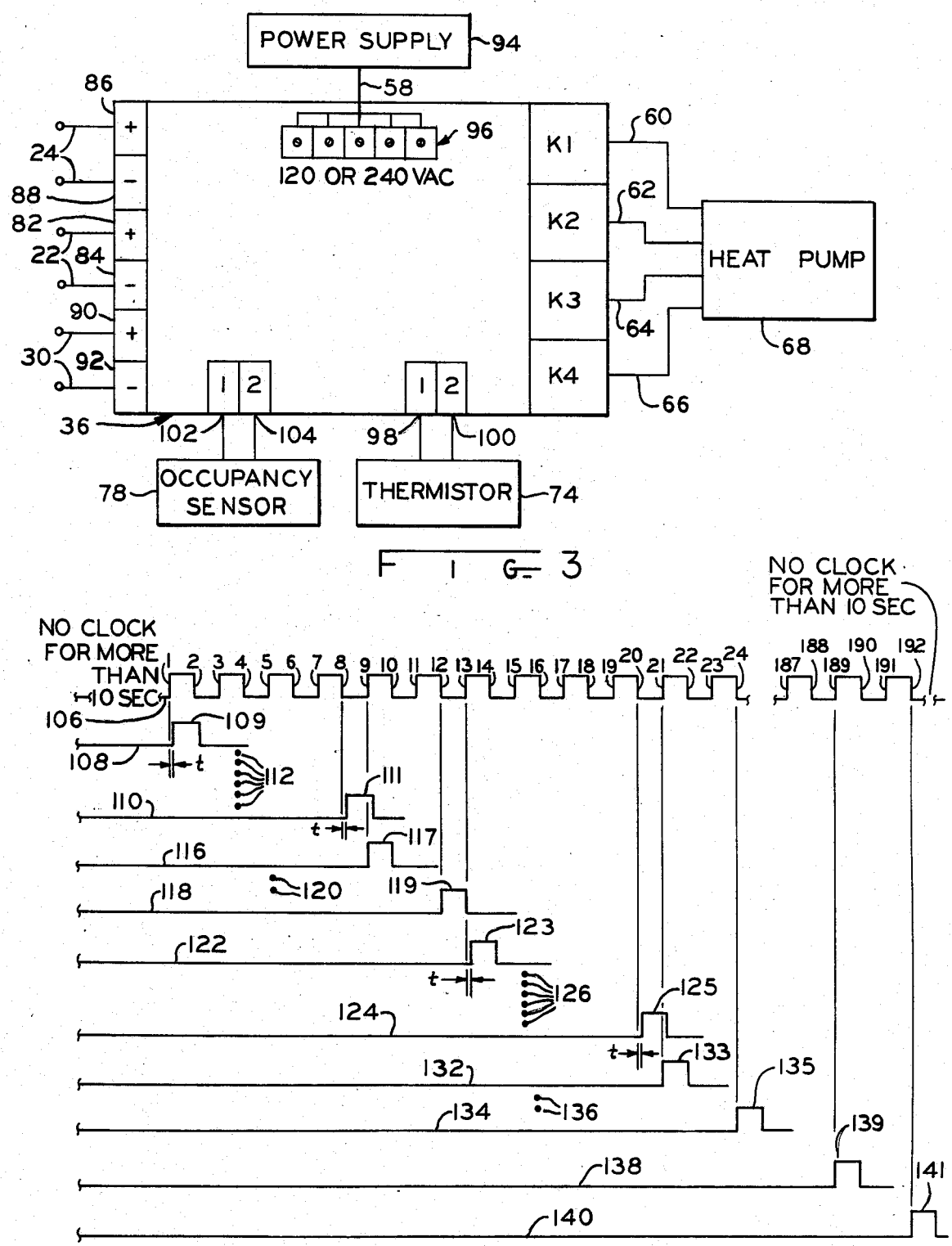

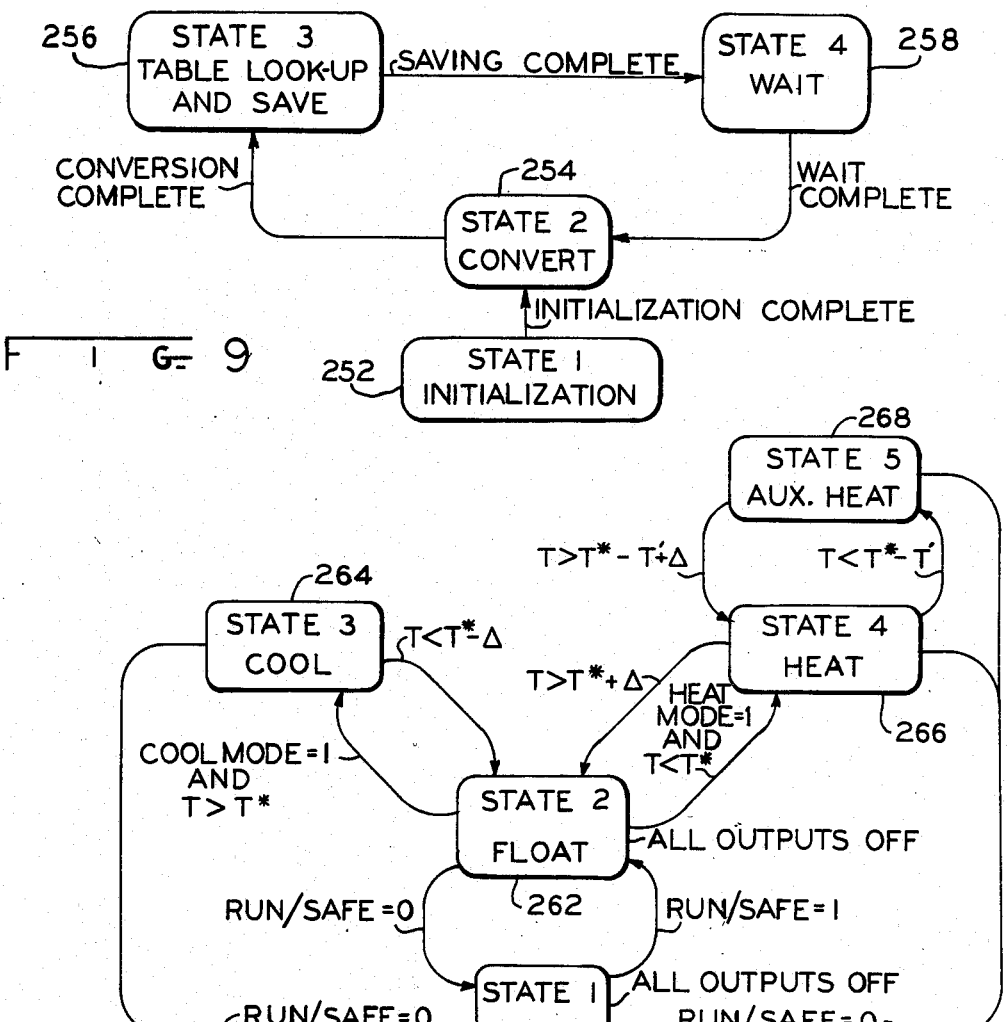
FIG. 9
FIG. 10
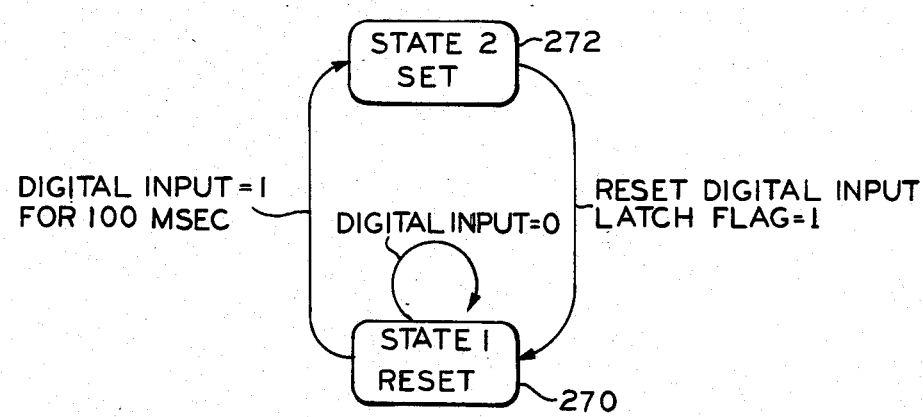
FIG. 11

4,661,914

ENERGY MANAGEMENT CONTROL APPARATUS

BACKGROUND OF THE INVENTION

1. Field of the Invention

This invention is in the field of energy management systems and more particularly a system for managing a large number of separate heating and cooling devices at separate locations.

2. Description of the Prior Art

Energy management systems are commonly used in those applications where a relatively large number of stations at separate locations which have individual energy requirements are managed by a central controller. In such systems each station reports to the controller the current conditions at the station and the controller determines the energy requirements for that station and transmits information to that station to control a local energy system at that station to bring the current condition to a desired condition.

For example, where the energy management system is for heating and cooling of each station the controller can receive the current temperature at each station and then transmit signals to control the station heating and cooling system to obtain a desired temperature at that station. The communication between the controller and each station is performed repetitively at frequent intervals to increase control quality. It is often necessary for one controller to communicate with a relatively large number of stations, in the order of hundreds, and therefore it is highly desired to minimize the length of the communication message to each station, the communication power requirements and the communication hardware.

SUMMARY OF INVENTION

An energy management controller that has a programmable computer processor communicates with a plurality of remote stations on three line pairs. The first line pair carries serial clock bits; the second line pair carries serial "data out" bits; the third line pair carries serial "data in" bits. Each station has a microprocessor or microcontroller that has a counter which counts the clock bits and each station compiles an address count. The address count is incremented by one after each predetermined number of clock bit transitions, or bit edges, and as will become apparent, the predetermined number of clock transitions corresponds to the number of "data out" and "data in" bits desired for a communication message between the controller and each station.

Each station can be manually set to a particular respective address count for that station. Once the number of clock transitions reaches that address count for a particular station, that station is automatically enabled to communicate with the controller for an address count period which is until the next address count increment. After the address count period, that particular station data communication with the controller is disabled and another station is enabled to communicate data with the controller. Each station continually receives clock transitions from the controller, however. In this manner the stations are sequentially enabled for data communication with the controller without the need for address bits from the controller.

The interchange of information between the controller and each station may take many forms. In the disclosed preferred embodiment each station has its own heating and cooling apparatus such as a heat pump. A station reports to the controller an eight bit message notifying the controller of the temperature at that station and the controller instructs the station to actuate its heating and cooling apparatus to achieve a desired temperature at that station. The controller instruction may take the form of actual heat pump commands or a desired station "set point" temperature. In the latter case, each station has a microprocessor that measures the temperature "float" between controller instructions and if the temperature direction is up and the desired temperature is outside a predetermined "dead band" from the actual station temperature, the station microprocessor actuates the heat pump cooling mode until the desired temperature is reached. And if the temperature direction is down and the aforementioned "dead band" exists, the heat pump heating mode is actuated until the desired temperature is reached.

Each station can forward other information to the controller such as whether the zone controlled by the station is occupied by a person. Thus when each station controls the temperature of a hotel or motel room, the controller can make desired adjustments to the transmitted temperature to the station taking into account room occupancy for energy conservation purposes.

The clock rate of the controller varies in order to accomodate the time required by the controller to perform its functions. The fastest clock bit rate is limited by the time required for each station control to perform its temperature conversion and other functions. Each station control adjusts itself to a controller clock pulse rate period in the order of 0.1 sec and higher. Each station has a fail safe mode so that when no clock transition is received for a period such as ten seconds all counters and the heat pump command register are reset to zero awaiting restart of the clock bits. Thus if the controller senses an alarm condition it can stop transmitting the clock bits and each station will go into the fail safe mode before the heat pump interlocks trip and have to be manually reset.

Because of the economy in communication message length and the use of a station microprocessor a large number of stations may be controlled from a single controller and the very low line current requirements reduce the wire size of the line pairs and provide large system capacity.

It is therefore an object of this invention to provide an energy management control system having economies of communication message length and line power requirements and that has a large system control capacity.

Another object is to provide a controller transmitting serial clock bits to a plurality of stations each station having a microprocessor for digitizing information gathered at the station and for counting clock bits and each station can be set to enable itself for data communication for a period after a predetermined number of clock transitions are counted and to synchronize with a periodic controller communication.

A further object is to provide a system of the previous objects wherein each station provides operating inputs to energy using equipment such as a heating and cooling system and has a microprocessor for sensing the direction of temperature float at the station between communications from the controller to actuate the heat mode or cool mode of the system depending on such direction.

Another object is to provide a station zone occupancy sensor and informing the controller of zone occupancy in devices of the previous objects for purposes of energy conservation.

A still further object of this invention is to provide the system of the previous objects with a fail safe mode at each station that will reset the station microprocessor upon nontransmission of the clock bits for a given period.

The above mentioned and other features and objects of this invention and the manner of obtaining them will become more apparent and the invention itself will be best understood by reference to the following description of an embodiment of the invention taken in conjunction with the accompanying drawings.

BRIEF DESCRIPTION OF THE DRAWINGS

FIG. 3 is a connection schematic and block diagram for a station control circuit;

FIG. 4 is a timing diagram of one embodiment of the circuit of FIG. 1;

FIGS. 9-11 are subflow chart diagrams for the chart diagram of FIG. 8.

DESCRIPTION OF THE PREFERRED EMBODIMENTS

Figure 1:
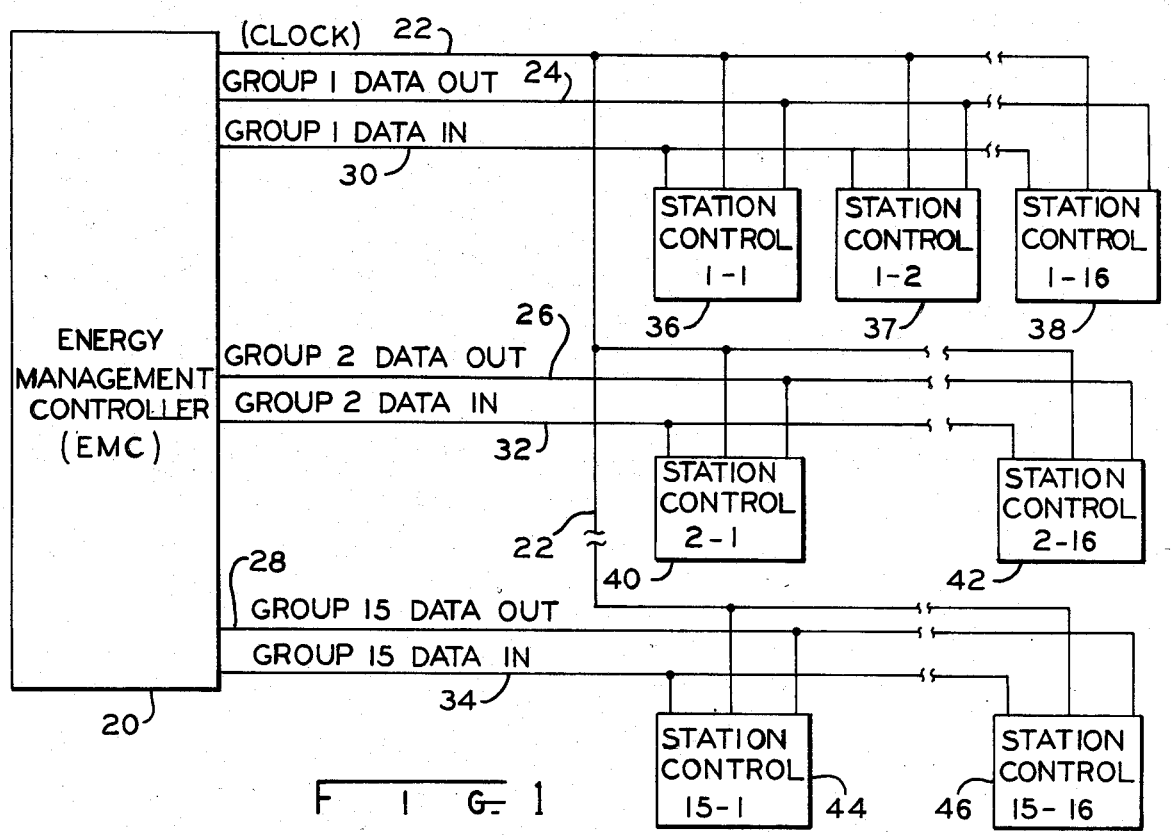
FIG. 1 is a simplified block partial broken diagram of a circuit of this invention.

Referring to FIG. 1 an intelligent controller or energy management controller 20 is a programmable controller that is located at a base station and is programmed to perform energy management. In the disclosed embodiments herein the energy management is for heating and cooling of a large number of individual stations, such as hotel or motel rooms. The energy management may be for other purposes.

Controller 20 provides a clock signal on line pair 22 at a frequency of one Hz in the examples disclosed herein and this frequency may be varied as desired in conformance with the teaching herein. Controller 20 also provides a group "data out" signal on each of line pairs 24, 26, 28 and a group "data in" signal on each of line pairs 30, 32, 34. All of the line pairs have a signal line and a return line. In the disclosed embodiments there may be as many as fifteen different groups for each controller 20, only three being shown in FIG. 1 for explanation purposes. The group number may be varied. A common clock line pair 22 is provided to each group while each group is provided with a separate "data out" line pair and a separate "data in" line pair.

Each group "data out" line pair 24, 26, 28 is provided to a plurality of station controls, each having a microcomputer or microcontroller, and in the disclosed embodiment sixteen station controls for each group are shown although this number may be varied as desired in accordance with the principles disclosed herein. Only a portion of the station controls in each group are shown for purposes of explanation. Group 1 line pairs 24, 30 are coupled to station controls 36, 37, 38 it being understood they are likewise connected to each of the other station controls in group 1. Group 2 line pairs 26, 32 are coupled to station controls 40, 42 and group 15 line pairs 28, 34 are coupled to station controls 44, 46, again it being understood that there are groups 3-14, not shown, and 16 station controls in each group. Station control 36 has designation 1-1, group 1-control 1, control 37 has designation 1-2, group 1-control 2, and station control 38 has designation 1-16, group 1-control 16. In like manner station control 44 is designated 15-1, group 15-control 1, and control 46 is designated 15-16, group 15-control 16. Thus there are 240 station controls, 15 groups times 16 controls/group, coupled to and controlled by controller 20 and each station control is for temperature controlling a station zone such as a hotel or motel room.

Figure 2:
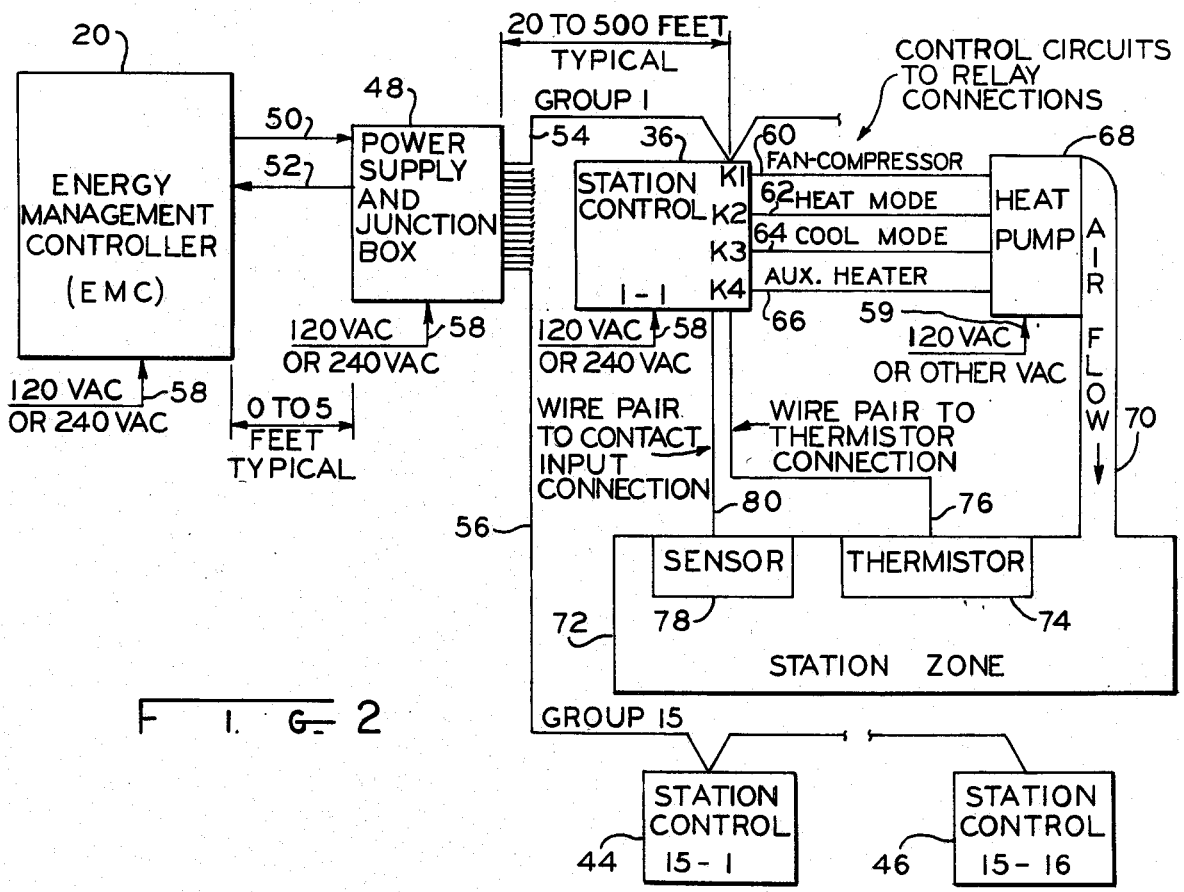
FIG. 2 is a simplified block partial broken diagram of the circuit of FIG. 1 showing the station conditioned zone schematically.
Figure 6:
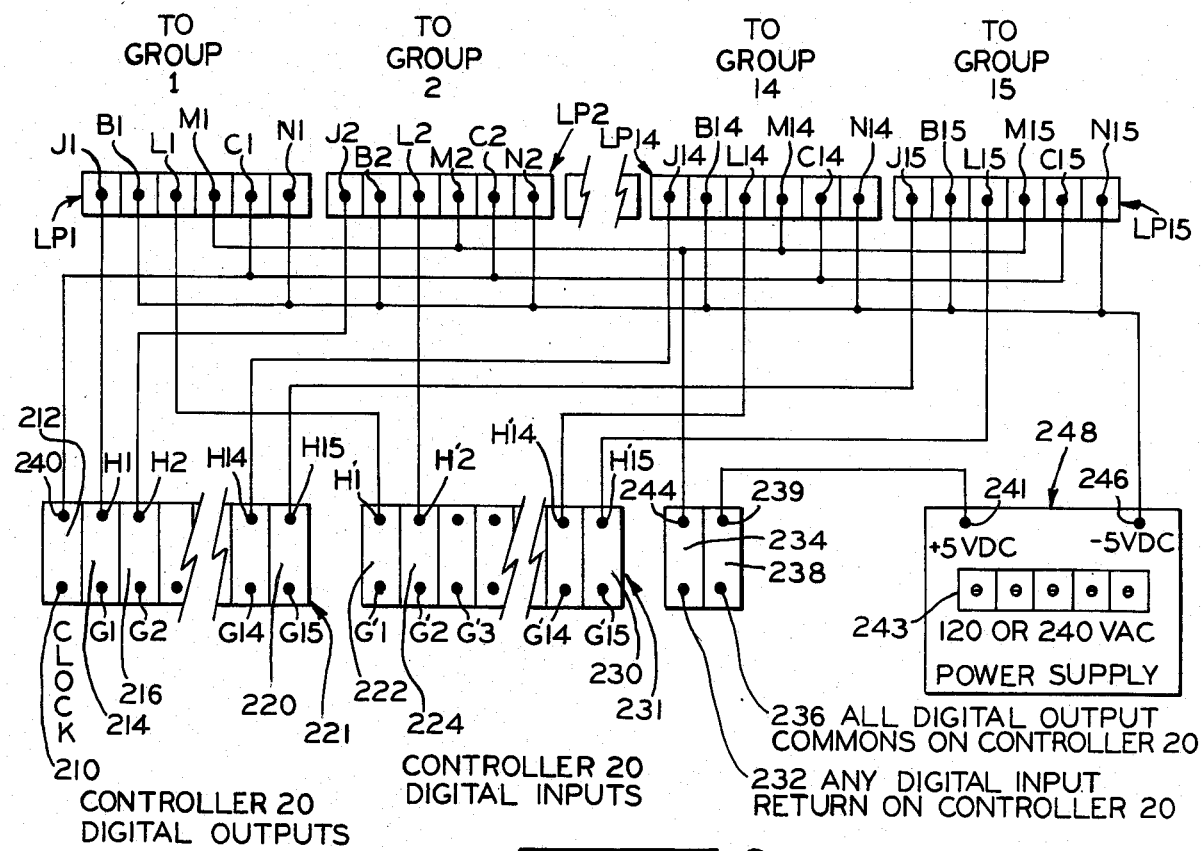
FIG. 6 is a schematic broken diagram of a power and distribution panel for the circuit of FIG. 1.

Referring to FIG. 2 management controller 20 is coupled to interface input/output power supply and junction box 48, described in more detail in conjunction with FIG. 6, which acts as a convenient interface between controller 20 and each of the station controls of which only controls 36, 44, 46 are shown in FIG. 2 for purposes of explanation. Typically box 48 is located less than five feet from controller 20. Line 50 between controller 20 and box 48 comprises a clock line pair 22 and a controller 20 output line pair to each of the fifteen groups. Line 52 between controller 20 and box 48 comprises a controller 20 input line pair from each of the fifteen groups. Line 54 from box 48 comprises a clock line pair 22, "data out" line pair 24 and "data in" line pair 30 for group 1 and is connected to each of the controls in group 1 as described and shown for the circuit of FIG. 1. Line pair 24 is for the "data out" from each station control in group 1 to controller 20 and line pair 30 is for the "data in" to each station in group 1 from controller 20. The line pairs in line 54 are coupled to the terminals of control 36 in the manner shown and described for the circuit of FIG. 3. Typically control 36 is 20-500 feet from box 48 although distances from 0-2000 feet are possible with the circuits and wire sizes disclosed herein. Line 56 from box 48 comprises a clock line pair 22, "data out" line pair 28 and "data in" line pair 34 for group 15 and is connected to each of the controls in group 15 as described and shown for the circuit of FIG. 1. A line similar to lines 54, 56 is provided for each of groups 2-14 but only lines 54, 56 are shown for explanatory purposes. Each control is provided with line power, such as 120 VAC or 240 VAC, on line 58 with only control 36 being shown so provided for purposes of explanation. Lines 60, 62, 64, 66 are coupled between relays K-1, K-2, K-3, K-4 respectively of control 36 to provide control signals for the fan and compressor circuit, heat mode circuit, cool mode circuit and auxiliary heat circuit, respectively, in heat pump 68. Heat pump 68 is also provided with power on line 59 which may be 120 VAC or other voltage and provides temperature controlled air flow through duct 70 to station zone 72, which as mentioned may be a hotel or motel room. Zone 72 has thermistor 74 for measuring the temperature in zone 72 and providing an analog temperature signal on line 76 to control 36. Zone 72 also has sensor 78, used in the embodiment of FIGS. 7-11, for sensing person occupancy of zone 72 and transmitting occupancy information on line 80 to control 36. Sensor 78 may be of a variety of devices such as ultrasonic sensors known to the art or an occupant operated push button. It is understood that each station control in each group has the associated circuitry, heat pump and station zone shown for control 36.

Referring now to FIG. 3 a connection diagram for control 36 is shown, it being understood each control in each group has a similar connection diagram. Clock line pair 22 is connected to terminals 82, 84; "data out" line pair 24 is connected to terminals 86, 88; and "data in" line pair 30 is connected to terminals 90, 92. Power line 58 is connected between power supply 94 and terminal block 96. Relays K1-K4 are connected to heat pump 68 and carry control signals for fan and compressor, heat mode, cool mode and auxiliary heat, respectively. Thermistor 74 is connected to terminals 98, 100 and sensor 78 is connected to terminals 102, 104.

Referring to FIG. 4 a system timing diagram having a number of waveforms is shown, each waveform having amplitude measured on the vertical y axis and time measured on the horizontal x axis. The timing diagram is for group 1 control stations, it being understood that each group has a similar timing diagram. Clock waveform 106 is sent from controller 20 to each station control on line pair 22 and has a series of transition edges from up to down and from down to up. These transitions are an indication from controller 20 to each of the station controls that controller 20 has read the status of "data out" signals on the line pairs such as line pairs 24, 26, 28 and established a new status for "data in" signals on the line pairs such as line pairs 30, 32, 34. The edges are numbered from 1-192 with waveform 106 being broken and only a portion of the edges shown for explanatory purposes. Each series of 192 edges comprises a communication frame. The transition interval, or time between adjacent edges, may vary and is typically from 0.2 to 9.8 sec. Before and after the 192 series of edges in waveform 106 there are no transitions or edges in waveform 106 for 10 sec. As will become apparent the data communication period between controller 20 and a particular station control is 12 transition edges long and with 16 station controls in a group, a communication frame of 192 edges provides for data communication exchange between controller 20 and each station control in a group. Since all 15 groups are being accessed by controller 20 concurrently, after a period of 192 edges every station control in every group has been accessed by controller 20. In the embodiment of FIGS. 1-6 a period of 12 edges is used for data communication exchange with each station. A period of a different number of edges may be used and for the embodiment of FIGS. 7-11 the period is 17 edges per station control. Waveform 108 pulse 109 is the MSB (most significant bit) of eight bits transmitted on line pair 30 from the first station control in a group, e.g. control 36 in group 1, to controller 20 and represents station zone 72 temperature as measured by thermistor 74 and converted to a digital signal as will be explained. Waveform 110 pulse 111 is the LSB (least significant bit) of the eight bits representing zone 72 temperature. The intervening six waveforms representing the intervening six bits are not shown and for simplification are represented by dots 112. The leading edge of pulse 109 in waveform 108 corresponds to and lags edge 1 of waveform 106 by a time "t", in the order of milliseconds, and is due to the time required by control 36 to recognize that a transition has occurred and to determine and assert the correct status for the MSB of zone 72 temperature. The leading edges of the pulses on successive waveforms 108, 112, 110 corresponds to waveform 106 transition edges 1-8, respectively, displaced by time t. As is understood in the art the presence or absence of a pulse on a waveform corresponds to a digital 1 or 0 respectively for conveying information digitally.

Waveform 116 pulse 117 is the MSB of the control data sent to control 36 on line pair 24 from controller 20 for controlling the state of relay K-1 and waveform 118 pulse 119 is the LSB on line pair 24 for controlling the state of relay K-4. Waveforms for controlling the state of relays K-2, K-3 are similar and are represented by dots 120. The leading edges of the pulses on successive waveforms 116, 120, 118 correspond to waveform 106 edges 9-12 respectively. During the time period defined by waveform 106 edges 1-12, only the first station of each group 1-15 is accessed or addressed by controller 20.

Waveform 122 pulse 123 is the MSB and waveform 124 pulse 125 is the LSB of eight bits for transmission of station zone temperature to controller 20 from the second station in each of groups 1-15; control 37, FIG. 1, being the second station in group 1. The intervening six waveforms are represented by dots 126. The leading edge of pulse 123 corresponds to waveform 106 edge 13 displaced by time t and the leading edge of pulse 125 corresponds to waveform 106 edge 20 displaced by time t, the leading edges the successive intervening six waveforms represented by dots 126 corresponding to waveform 106 edges 14-19 in the manner described for the leading edges of pulses on waveforms 108, 112, 110. Waveform 132 pulse 133 is the MSB of control data to station control 37 from controller 20 for controlling the state of relay K-1 and waveform 134 pulse 135 is the LSB on line pair 24 for controlling the state of relay K-4 for the station control 37 heat pump. Waveforms for controlling the state of relays K-2, K-3 for the station of control 37 are similar and are represented by dots 136. The leading edges of pulses on each of successive waveforms 132, 136, 134 correspond to waveform 106 edges 21-24 respectively. During the time period defined by waveform 106 edges 13-24 only the second station of each group 1-15 is accessed or addressed by controller 20, e.g. station 37 in group 1.

Thusly each station control in a group is addressed during a respective 12 transition edge period in clock waveform 106: the first station control in each group during edge 1-12 period; the second station control in each group during edge 13-24 period; and so forth until the sixteenth station control in each group is addressed during the edge 181-192 period. Waveform 138 pulse 139 is the MSB of the control data sent to station control 38 on line pair 24 for controlling the state of relay K-1 and waveform 140 pulse 141 is the LSB on line pair 24 for controlling the state of relay K-4 for the station control 38 heat pump. The leading edges of pulses 139, 141 correspond to waveform 106 edges 189, 192, respectively. During the time period defined by waveform 106 edges 181-192 only the sixteenth station of each group 1-15 is accessed or addressed by controller 20, e.g. station 38 in group 1. Each station control determines that exactly 192 edge counts were counted by the station control thus verifying the accuracy of transmission for the group so that all heat pump relays in the group may be set.

Each control in each group is provided with an address increment counter that is incremented by one for every 12 edges of waveform 106. Thus there are 16 address counts for every 192 edge counts. An address switch is manually set in each control to recognize a particular address count from 1-16 so that each control in a group has a different address count switch setting. A control is enabled to transmit data to or receive data from controller 20 depending on the setting of the address count switch for that control. For example, group 1 control 36 communicates data with controller 20 only during the period defined by waveform 106 edges 1-12; control 37 only during the period defined by edges 13-24; and so forth for each control in group 1 until control 38 which communicates data only during the period defined by edges 181-192. The above data communication periods are true for the station controls in every group so that each control station in every group, 240 control stations in the above example, are addressed without any address bits in the communication from controller 20. Each station control is continually in communication with clock line pair 22 from controller 20.

Figure 5:
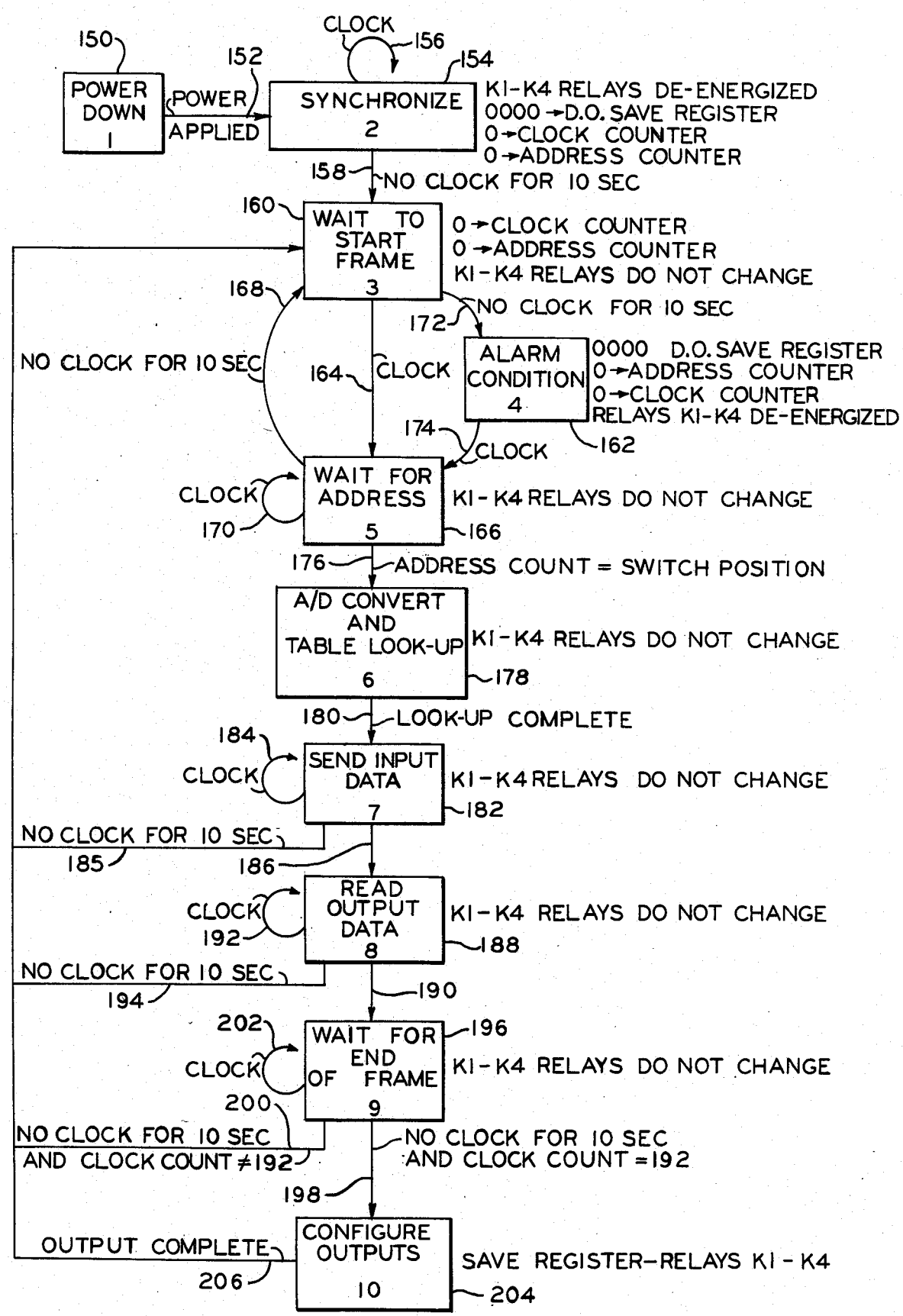
FIG. 5 is a flow chart diagram for the embodiment of FIG. 4.

Referring to FIG. 5, a flow chart diagram for a station control for the embodiment of FIGS. 1-4 is shown. It is understood that each station control has a similar flow chart diagram and the chart of FIG. 5 is for control 36. Stage 150 represents the power down stage for the control process. It is assumed in this description that clock waveform 106 frequency is varying near one hertz. Power is applied to the system as indicated by flow line 152. At synchronize stage 154 intialization takes place which causes relay outputs to relays K1-K4 to be in a de-energized state; sets the four bit "data out" save register for lines 116, 120, 118, FIG. 4 to zero; sets a control clock counter to zero; and sets the address counter to zero for control 36. Flow line 156 indicates that as long as clock transitions occur more frequently than once every 10 seconds the station control 36 remains in the state of stage 154. Flow line 158 indicates that if there are no clock transitions for a period of 10 seconds, then the process goes to stage 160. If there are no edge counts during the 10 second period, then the process goes to wait to start frame stage 160 at which point the control clock counter and address counter are reset to zero and outputs to relays K1-K4 do not change. If, after the process is in stage 160, there is no clock edge for 10 seconds as indicated by flow line 172, indicating something is wrong, the process goes to alarm condition stage 162 where initialization similar to that for stage 154 takes place. This is a fail safe mode which de-energizes the relays K1-K4. The existence of this mode assures the user that the controlled heat pump, or other equipment, will be put into a safe condition if communication is lost between controller 20 and a station control e.g. control 36. An important advantage of this invention is that controller 20 can deliberately change all station controls to the fail safe mode or condition by ceasing change of state of the clock output for a predetermined time period. Such a tactic might be utilized if, for example, the controller 20 has determined that a central cooling tower has failed and by stopping the clock the controller 20 will cause all station controls to turn off their respective heat pumps within 20 seconds or before overheating would otherwise cause local interlocks to shut heat pumps down. Thus manual resetting of each of 240 heat pump interlocks is avoided resulting in savings of considerable time and cost. However if an individual heat pump has a mechanical or electrical problem, its interlock will be tripped to prevent damage.

If the clock edges continue as indicated by flow line 164, the process goes to the wait for address stage 166. The process remains in stage 166 as indicated by flow line 170 unless or until the event indicated by flow line 168 or flow line 176 occur. If there is no clock edge for 10 seconds while the process is in wait for address stage 166 the process reverts to stage 160 as indicated by flow line 168. The communication process remains in the alarm state, stage 162, until the next clock transition occurs as indicated by flow line 174 at which time the system process advances to stage 166.

Each control is set, as by a switch position, for an address count of 1-16 and the system compares the set address count with the current address count as indicated by flow line 176 and when they match the system continues and converts thermistor 74 analog temperature to a digital signal which is further converted to a digital signal by successive approximations and by means of a look-up table in stage 178. For control 36 the set address count is "1" so that control 36 starts with waveform 106 edge count "1". For control 37 the address count is "2" and it starts data communication with controller 20 with edge count 13.

The lookup table converts the digital signal as follows:

$$T = 50 + (40N)/256$$

or $$N = 6.4(T - 50)$$

where T = thermistor 74 temperature in degrees fahrenheit. N = 8 bit digital number from the look-up table.

The purpose of this conversion is to scale a temperature range, in this example a range of 50° F.-90° F., into the available digital information that can be conveyed with a predetermined number of assigned digital bits, in this example 8 bits.

If thermistor 74 temperature T results in a zero or negative value of N, a value of N = 1 will be transmitted to assure controller 20 that communication has not been lost with the station control. The A/D (analog to digital) conversion and the look-up is done in less time than the minimum clock edge interval.

When look-up is complete, indicated by flow line 180, the MSB of the number N is transmitted on line pair 24 during send input data stage 182. As indicated by flow line 184, the remaining 7 bits of the number N are transmitted in the order of their significance on line pair 24 after successive clock transitions. However, if during stage 182 no clock edges are received for 10 seconds, as indicated by flow line 185 the system reverts to stage 160. When all eight bits of the number N are transmitted to controller 20 on line pair 24 as indicated by line 186, station control 36 proceeds to the read output data stage 188 during which it reads the four bits of output commands for relays K1-K4 on line pair 30. Flow line 192 indicates that the four bits are read on succeeding clock transitions during the period of waveform 106 clock edges 9-12. If during the operation of stage 188 there is no clock edge for 10 seconds, as indicated by line 194, the process reverts to stage 160. In order to insure that the clock sequence and all of the information communication between controller 20 and each station control in a respective group is complete, after all four bits are read by stage 188 the process as indicated by line 190 procedds to wait for end of frame stage 196 where the process waits for the clock edge count to reach 192 followed by a no clock edge for more than 10 sec as indicated by line 198. If there is not a no clock for 10 sec or the clock edge count for the frame does not equal 192, the system reverts to stage 160 as indicated by flow line 200. Flow line 202 indicates the clock is still running. If there is a clock edge count of 192 and a delay of at least 10 seconds where there is no clock edge count, then it is assumed the communications are complete and accurate and the system proceeds to configure outputs at relays K1–K4 at the configure outputs stage 204. As soon as the relay outputs have been configured, control 36 starts the process again at stage 160 as shown by flow line 206. Thus the outputs to relays K1–K4 are not set to the desired state until a complete and valid frame has been received. The outputs to relays K1–K4 are saved in a register in control 36. During stages 160, 166, 178, 182, 188, 196 relay outputs to relays K1–K4 do not change.

Referring to FIG. 6 power supply and junction box 48 will be described. Box 48 greatly simplifies the connections between controller 20 and each of the line pairs to groups 1–15. The purpose of interface box 48 is to simplify implementation of the clock, "data in" and "data out" circuits between controller 20 and groups 1–15 and to provide a source of voltage for the communication circuits. The signal line in clock line pair 22 from controller 20 is connected to pin 210 on conductive bar 212 having pin 240; the signal line in controller 20 data output in line 50 (FIG. 2) for group 1 is connected to pin G1 on conductive bar 214 having pin H1; the signal line in the controller 20 data output in line 50 to group 2 is connected to pin G2 on bar 216 having pin H2 and so forth with the signal line in controller 20 data output line 50 to group 15 connected to pin G15 on bar 220 having pin H15. The signal line to each group in controller 20 data output line 50 is connected to a corresponding pin, the pin being designated by the letter G followed by the group number, the pins being on respective spaced conductive bars on dielectric block 221.

The signal line controller 20 data input line 52 (FIG. 2) for group 1 is connected to pin G'1 on bar 222 having pin H'1, the signal line in controller 20 data input line 52 from group 2 is connected to pin G'2 on bar 224 having pin H'2 and so forth with the signal line in controller 20 data input line 52 from group 15 connected to pin G'15 on bar 230 having pin H'15. The signal line from each group in controller 20 input data line 52 is connected to a corresponding pin, the pin being designated by the letter G' followed by the group number, the pins being on respective spaced conductive bars on dielectric block 231.

All return lines from each group in controller 20 data input line 52 are connected to pin 232 on bar 234 having pin 244 and all return lines to each group in data output line 52 from controller 20 are connected to pin 236 on bar 238 having pin 239 coupled to +5 VDC terminal 241 of power supply 248. Supply 248 is provided with 120 VAC or 240 VAC at terminal block 243. Controller 20 has a common return for all digital signal input lines in line 52 to controller 20 from all of the station controls in a group and this common return is connected to pin 232. Controller 20 has a form C relay, known to the art, for each group. The form C relay has a common terminal and a normally open terminal which is connected to a group signal line in controller 20 data output line line 50. All group return lines in controller 20 data output line 50 are connected to pin 236 which is coupled to all the common terminals in all the form C relays for all the groups. There is also a form C relay in controller 20 for the clock line pair for all groups with the common terminal being coupled to terminal 236 and the clock signal line for all groups being coupled to pin 210. In a form C relay there is continuity between the common terminal and the normally closed terminal and no continuity between the the common terminal and the normally open terminal when the relay is de-energized. Conversely, there is no continuity between the common terminal and the normally closed terminal and continuity between the the common terminal and the normally open terminal when the relay is energized.

Pin 240 on bar 212 is coupled to each clock signal pin for each group 1–14, pins C1, C2, C14, C15 being shown. The pins on block 221, such as pins H1, H2, H14, H15 are coupled to corresponding pins on a line pair block for each group, line pair blocks LP1, LP2, LP14, LP15 being shown. Pin H1 is coupled to pin J1 on block LP1 and pins H2, H14, H15 being coupled to pins J2, J14, J15 respectively. A pin on each line pair block LP1–LP15 is coupled to pin 244, the connections for pins M1, M2, M14, M15 on line pair blocks LP1, LP2, LP14, LP15 respectively being shown. A pin on each line pair block LP1–LP15 is coupled to a corresponding pin on block 231, pins H'1, H'2, H'14, H'15 being shown coupled to pins L1, L2, L14, L15 respectively on line pair blocks LP1, LP2, LP14, LP15 respectively. Two pins on each line pair block are coupled to −5VDC terminal 246 of power supply 248, those two pins being B1, N1 for block LP1; pins B2, N2 for block LP2; pins B14, N14 for block LP14; and pins B15, N15 for block LP15 being shown. Connected to each line pair block LP1–LP15 are the three line pairs to groups 1–15 respectively. For example, the signal and return lines of clock line pair 22 to group 1 station controls is coupled to pins C1, N1 respectively in block LP1; the signal and return lines of "data in" line pair 30 to group 1 station controls is coupled to pins J1, B1 respectively in block LP1; the signal and return lines of "data out" line pair 24 to group 1 station controls is coupled to pins L1, M1 respectively in block LP1. In like manner the clock, "data in" and "data out" line pairs are coupled to their respective pins in each group line pair block LP1–LP15.

Referring to FIGS. 7–11 a second embodiment is shown similar to the embodiment shown in FIGS. 4, 5 except that each station control, e.g. controls 36, 37, 38 (FIG. 1) for group 1, controls 40, 42 for group 2, and controls 44, 46 for group 15 perform additional functions that otherwise would be performed in controller 20. Briefly, for the embodiment of FIGS. 7–11, a set point temperature is transmitted from controller 20 to each station control and the station controls compare this temperature with the measured temperature in the respective station zone to provide for the necessary control signals to set heat pump relays K1–K4. A set point temperature for each station zone is programmed into controller 20. Instead of a period of 12 clock edges defining a control communication period, as for the embodiment of FIGS. 4, 5, a period of 17 clock edges define each control communication period in the embodiment of FIGS. 7–11. Thus a communication frame period for the embodiment of FIGS. 7–11 is defined by 272 clock edges, 17 edges/control times 16 controls. In addition, for the embodiment of FIGS. 7–11 zone occupancy is sensed by sensor 78 for each station zone and this information is transmitted by an additional bit from the respective station control to controller 20 where it is used to determine the set point temperature for that station. An unoccupied room does not require the temperature control of an occupied room and therefore heating and cooling energy can be conserved.

Figure 7:
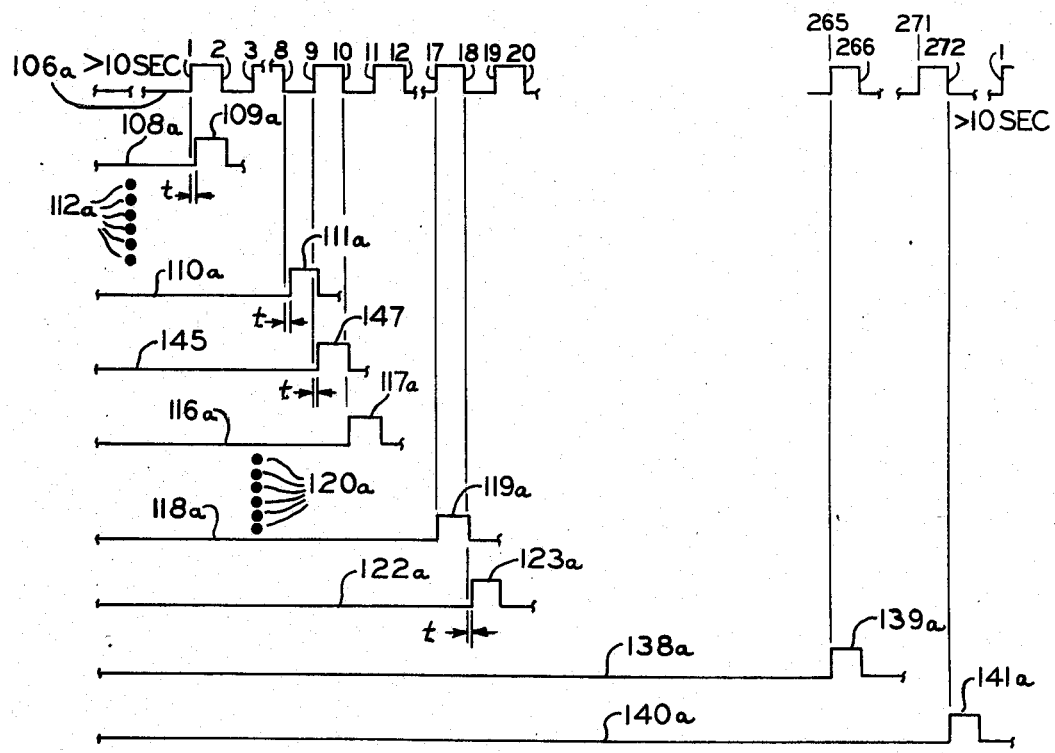
FIG. 7 is a timing diagram for a second embodiment of this invention.

Referring to FIG. 7 the reference numerals of FIG. 4 are used followed by a suffix "a" for similar waveforms and the explanation for FIG. 4 will apply except that each control receives 8 bits of information representing the station control set point temperature on eight waveforms 116a, 120a, 118a from controller 20 on line pair 24 instead of four bits of information on 4 waveforms 116, 120, 118 on line pair 24 to control relays K1–K4. The leading edge of pulse 117a on waveform 116a occurs at waveform 106a clock edge 10 and is the MSB of the set point temperature and the leading edge of pulse 119a on waveform 118a occurs at waveform 106a clock edge 17 and is the LSB of the set point temperature. The leading edges of the pulses on the intervening six waveforms representing the intervening six bits of the set point temperature and are represented by dots 120a and occur respectively at waveform 106a clock edges 11–16. A further difference from the FIG. 4 diagram is waveform 145 having pulse 147 which occurs at waveform 106a clock edge 9 and represents zone occupancy as determined by sensor 78 and is transmitted to controller 20 on line pair 30. Waveform 122a represents the MSB of station zone temperature of station control 37 and the leading edge of its pulse 123a coincides with edge 18 of waveform 106a displaced by time t. Waveform 138a represents the MSB of the set point temperature transmitted to station control 38 and the leading edge of pulse 139a on waveform 138a coincides with edge 265 on waveform 106a. Waveform 140a represents the LSB of station control 38 set point temperature and the leading edge of pulse 141a of waveform 140a coincides with edge 272 on waveform 106a. The remaining waveforms and explanations for FIG. 4 apply.

Figure 8:
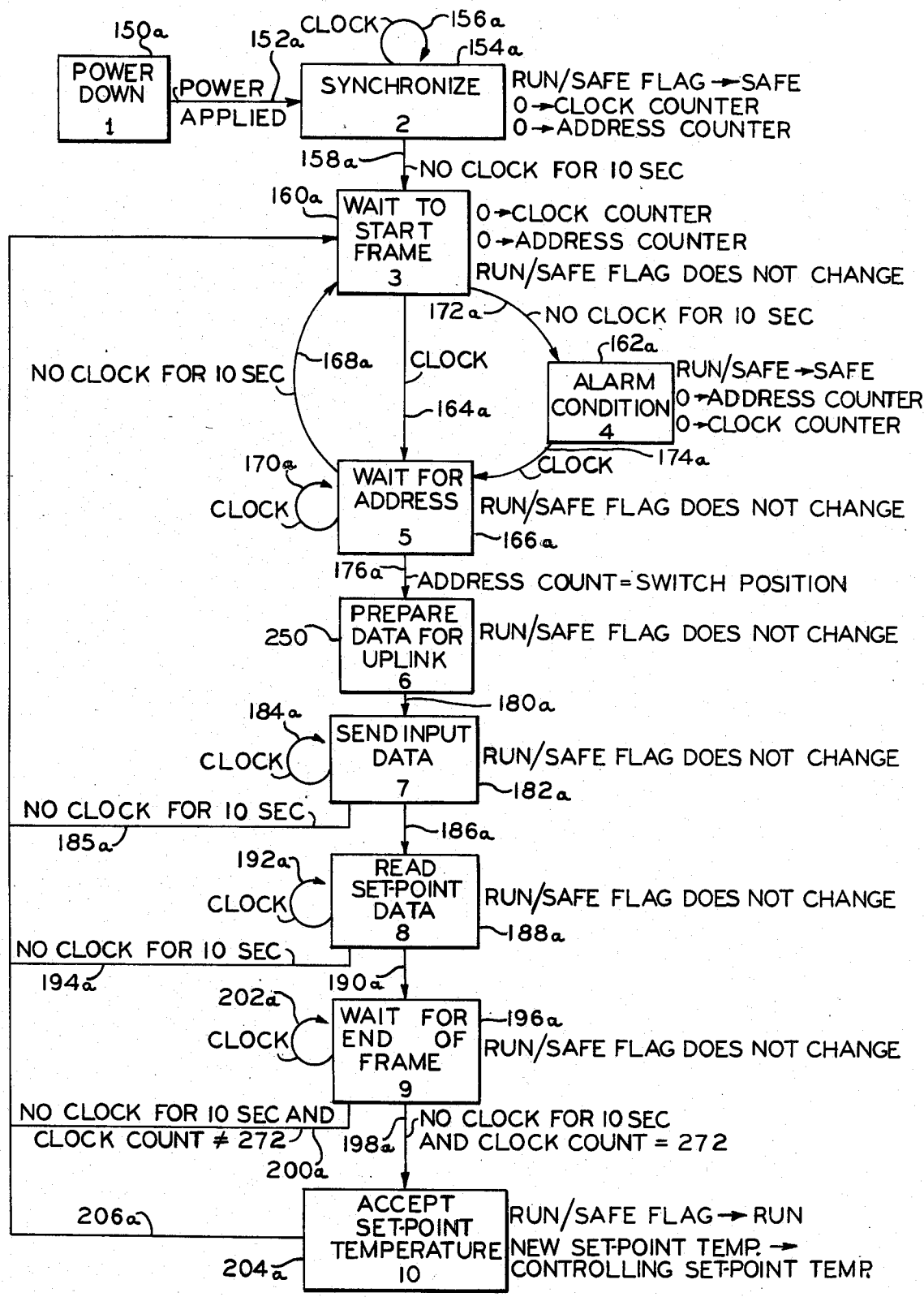
FIG. 8 is a flow chart diagram similar to the chart of FIG. 5 for the second embodiment of this invention.

Referring to FIGS. 8–11 there are shown state transition flow charts for four concurrently occurring processes, which are as follows: FIG. 8, Communication Process; FIG. 9 Analog to Digital Conversion Process; FIG. 10 Heat Pump Control Process; and FIG. 11 Digital Input Process. Each station control executes only some instructions from each of the above processes in turn. The coordination among the various processes is accomplished by means of an executive program which allocates the microprocessor resources at each station control among the various processes on a real time basis as is well understood in the art. Each process is defined and described by its state transition diagram which specifies an allowable set of states, the condition of the outputs in each state and the reasons for changing to any other allowable state. The basic assumption of the state transition diagram description is that the process remains in its current state unless a transition condition is satisfied.

Referring to FIG. 8 the state transition diagram for the communication process is shown. FIG. 8 is similar to FIG. 5 and similar stages having similar functions, adapted as explained below, will be numbered as in FIG. 5 with the addition of the suffix "a". State 1, Power Down stage 150a is the "null state" which the process is in by default whenever the station control microcomputer is not running. In this state all outputs for relays K1–K4 are de-energized. The transition condition, a restart from power failure, indicates that this process always begins executing in State 2, Synchronize, stage 154a. While in stage 154a the communication process sets a R/S (Run/Safe) flag to "Safe" which signals the Heat Pump Control Process, FIG. 10, to de-energize all outputs to relays K1–K4 and wait for a "Run" condition flag before proceeding. The only way for the communication process to proceed from stage 154a is for it to sense an absence of clock edges for 10 seconds.

In state 3, stage 160a, the communication process waits for up to ten seconds for a clock transition edge to occur. The clock counter and address counter in each station control is used to determine when to communicate with controller 20, and are reset while the process is in stage 160a. Outputs, including the R/S (Run/Safe) flag and outputs for relays K1–K4 do not change from the condition that the previous state had established. If a clock transition edge occurs while the process is in stage 160a, control passes to wait for address state 5, stage 166a, to wait for the particular station control's turn to communicate with controller 20. If no clock transition occurs during the ten second waiting period, something is assumed to have gone wrong with the communication link so the process proceeds to state 4 alarm condition, stage 162a, as with the process of FIG. 5.

While in stage 162a the communication process sets the Run/Safe flag to the "Safe" condition to signal the heat pump control process, FIG. 10, to de-energize the outputs for relays K1–K4. Station control address and clock counters are also reset so that the process will begin at the start of a new frame when clock transition edges resume. The communication process will remain in the alarm state of stage 162a until the next clock transition edge occurs. That transition will cause the process to proceed to state 5, wait for address, stage 166a.

While in stage 166a the communication process counts clock transition edges and increments the station control address counter each time seventeen transition edges have occurred. The Run/Safe flag remains in whichever condition has previously been established. If the clock stops changing for more than ten seconds, the process reverts to stage 160a, as for the process of FIG. 5. When a particular station control address counter matches the value read from the "address" configuration switches in the particular station control, indicating that the next seventeen clock edges are to be used to communicate with controller 20, the communication process proceeds to state 6, prepare data for uplink, stage 250.

Stage 250 is a transitory state in which the process saves the current value of the converted analog input from the process of FIG. 9 and the value of the digital input memory flag received from the process in FIG. 11. The reset digital input latch flag is set for the digital input process in the process of FIG. 11 as a signal that the previous station zone temperature and occupancy information has been transmitted to controller 20, after which the communication process proceeds to state 7, send input data, stage 182a.

Stage 182a is composed of nine substates 7.1–7.9 during which the eight bits of the converted analog value of station zone temperature from the process of FIG. 9 and the status of the occupancy digital input are communicated to controller 20. In each of these substates the station control clock counter is incremented each time a clock transition edge occurs. During substate 7.1 the MSB of the analog value of thermistor 74 temperature saved in stage 250 is impressed on a "data out" relay. The process remains in substate 7.1 until a clock transition edge occurs at which time it proceeds to substate 7.2. If no clock transition edge occurs for more than ten seconds, the communication process reverts to stage 160a. Action is similar for each of substates 7.2-7.9. In substate 7.8 the LSB of the saved converted analog value is impressed on the "data out" relay. In substate 7.9 the status of the occupancy digital input is sent to controller 20. On the next clock transition edge after substate 7.9 the communication process proceeds to state 8, read set point data, stage 188a.

Stage 188a comprises eight substates 8.1-8.8. The communication process proceeds from substate to substate for each clock transition edge. If the clock does not change state for more than 10 seconds the process reverts to stage 160a to await the beginning of a new frame. During substate 8.1 the MSB of the new set point temperature value is read from controller 20. During substate 8.2 the next most significant bit of the new set point temperature is read from controller 20. This process continues similarly until in substate 8.8 the LSB of the new set point temperature is read. During each of these substates the station control clock counter is incremented each time a transition edge occurs.

As soon as the new set point temperature LSB is read, and without waiting for another clock edge, the communication process proceeds to state 9, wait for end of frame, stage 196a. The process remains in stage 196a until the clock stops changing for 10 seconds, after which the total number of clock transition edges since the last 10 second rest period is compared to the number 272 which is 17 times the number set in the controls/group switches, i.e. the number of station controls in a group. If the number of transitions is not correct, the process reverts to stage 160a to await the start of a new frame. If the total number of transition edges is correct, the process moves to state 10, accept set point temperature, stage 204a, wherein the communication process sets the Run/Safe flag to "Run" and a new set point temperature is moved into the controlling set point location in the process of FIG. 10. The process then moves immediately to stage 160a to wait for the start of the next frame of clock edges.

Referring now to the state transition flow diagram of FIG. 9, the purpose of this process is to periodically, nominally every four minutes, read the analog input of station zone temperature thermistor 74, convert it to a digital value via successive approximations, convert that value via a look-up table and save the result in a set of the three latest converted values.

When the station control microcontroller restarts from a power down condition, stage 150a of FIG. 8, the process of FIG. 9 first goes into state 1, initialization, stage 252 wherein the locations reserved for the last three converted values of zone temperature are cleared to zero. As soon as initialization is complete the process proceeds to state 2, convert, stage 254, wherein the process rapidly accomplishes a successive approximation A/D (analog to digital) conversion of the analog station zone temperature input. The successive approximations algorithm is a well known technique for performing an A/D conversion using a microcontroller, a DAC (digital to analog converter) and a comparator all of which are in said station control and need not be described in detail here.

When the A/D conversion is complete the process proceeds to state 3, look-up and save, stage 256 wherein the digital number resulting from the A/D conversion is used as an index into a table of "output values" which are linearly related to the temperature of thermistor 74. The look-up table linearizes and scales the analog value. When the look-up value has been obtained it is stored as the most recent temperature value. The previous value and the one obtained before that are first moved into the successively "older" slots. If the two previous values are both zero, indicating that station control microcomputer has recently restarted the new look-up value will be copied into all three positions. When the saving of the value is complete, it is provided at stage 250 of FIG. 8 and moves to state 4, wait, stage 258 wherein the process does nothing until a timer expires. Then it returns to stage 254 to begin the next conversion.

The state transition diagram for the heat pump control process is shown in FIG. 10. This process manipulates the four outputs for relays K1-K4: relay K1-fan and compressor control; relay K2-cool mode solenoid control; relay K3-heat mode solenoid control; and relay K4-auxiliary heat control. It also monitors the Run/Safe flag from the communication process, state 204a of FIG. 8.

State 1, safe stage 260 is the initial state and the fail safe state for the process. As soon as power is applied this process enters stage 260 condition wherein all four outputs for relays K1-K4 are de-energized. The process remains in stage 260 until the communication process sets the Run/Safe (R/S) flag to a "1", or "Run", which information is obtained from stage 204a, FIG. 8, indicating that communication has been established with controller 20 and control of the heat pump can proceed.

When the R/S flag is set to "1", or "Run", the heat pump control process proceeds to state 2, float, stage 262 wherein all outputs for relays K1-K4 are de-energized but the process monitors the analog input from thermistor 74 corresponding to the zone temperature for the purpose of determining whether the station zone is naturally cooling or naturally heating. This is determined by comparing the current analog temperature value to the temperature value taken during the previous sample interval and during the sample interval before that. If each successive temperature, starting from the latest sample, is larger than the preceding value by a factor larger than the noise of the measurement device, i.e. thermistor 74, the control process concludes that the zone is naturally heating and, therefore, cooling mode is required from the heat pump and it sets a cooling mode flag.

If each successive temperature is less, starting from the latest sample, than the preceding temperature by a factor larger than the noise of the measurement device, the process concludes that the station zone is naturally cooling and, therefore, the heating mode is required from the heat pump and the heating mode flag is set. If the station zone temperature shows neither a positive nor a negative trend, the process will clear both the heating mode flag and the cooling mode flag to zero.

If the R/S flag changes to zero, "Safe", from stage 204a of FIG. 8, while the process is in the float state, stage 262, the process immediately reverts to safe stage 260. If the cool mode flag is set and the current station zone temperature is greater than the set point temperature established by the communication process, stage 188a of FIG. 8, the heat pump control process proceeds to state 3, cool, stage 264. In stage 264 the fan and compressor relay K1 and cool mode solenoid relay K3 are energized and both the heating mode solenoid relay K2 and the auxiliary heat relay K4 are de-energized. If the heat mode flag is set and the current station zone temperature is lower than the set point temperature from controller 20, the heat pump control process proceeds to state 4, heat, stage 266.

If the R/S flag changes to zero, "Safe", at stage 204a of FIG. 8, the process immediately reverts to stage 260. Otherwise the heat pump control process remains in stage 264 until the measured station zone temperature becomes less than the set point temperature from controller 20 value minus a deadband value of two degrees fahrenheit. This deadband is to prevent excessive cycling between the float stage 262 and cool stage 264. When the process initially returns to the float stage 262 it clears the cool mode flag in order to insure that a definite heating or cooling trend will be established.

In stage 266 the fan and compressor relay K1 and heat mode solenoid relay K2 are energized and both the cool mode solenoid relay K3 and the auxiliary heat relay K4 are de-energized. If the R/S flag changes to zero, "Safe", stage 204a of FIG. 8, the process reverts to stage 260. If the measured temperature from thermistor 74 is less than the set point temperature value from controller 20 minus eight degrees fahrenheit the process proceeds to state 5, auxiliary heat, stage 268. While in stage 266 when the measured temperature from thermistor 74 becomes greater than the set point temperature value from controller 20 plus deadband value of two degrees fahrenheit, the process proceeds to stage 262 and clears the heat flag.

In stage 268 only the cooling solenoid relay K3 is de-energized. The heating solenoid relay K2, auxiliary heat control relay K4 and fan and compressor relay K1 are all energized. The heat pump control process remains in stage 268 unless the R/S flag becomes zero, "Safe", in which case the process reverts to stage 260, or until the measured temperature from thermistor 74 becomes greater than the set point temperature value minus eight degrees fahrenheit plus deadband value corresponding to two degrees fahrenheit in this example, in which case the process returns to stage 266.

Referring to FIG. 11 a process is shown of determining whether a digital input from sensor 78 has closed, indicating occupancy, or some other condition which is desired for communication to controller 20, since the last time the station control was addressed by controller 20. The process of FIG. 11 works in coordination with the process of FIG. 8 through the reset digital input latch flag and the digital input memory flag. State 1, reset, stage 270, is the initial state which this process assumes when the station control microcontroller restarts from a power down condition. In this state, the digital input process clears the "reset DI latch" flag, and clears the "digital input latch" flag. A digital input of "1" occurs when sensor 78 is closed for more than a short time period such as 0.1 second, indicating zone occupancy and unless this happens, the process remains in stage 270. When a digital input, cf. waveform 145 pulse 147 of FIG. 7, is read for a full 0.1 second, indicating that the field contact for zone occupancy, sensor 78, has been closed, the digital input process of FIG. 11 moves to state 2, set, stage 272. In stage 272 the process no longer reads the zone occupancy digital input. The "digital input latch" flag is set and when the "reset digital input latch" flag changes to a "1", indicating that the communication process of FIG. 8 has read the digital input latch status and transmitted it to controller 20, the digital input process returns to stage 270.

In this invention all station controls in a group are connected in parallel on the same line pairs, there being no need for the communication lines to loop back to controller 20 thus facilitating station control connection and disconnection to the lines. The group size can thus be adjusted easily from 1-16 control stations by setting a "controls/group" switch at each station. Controller 20, which may be an Andover Controls model AC 256, is programmed to perform its functions by techniques known to the art and therefore are not described in detail here. All of the information communication between controller 20 and the station controls is in digital form insuring reliability and accuracy of the information. Relatively short lengths of wire between the control stations and their respective zone temperature sensors are made possible by this invention, thus minimizing noise which might otherwise interfere with accurate transmission of the analog zone temperature to the station control. Relatively low operating currents, e.g. 3 ma per station control and voltages less than 10 VDC, on the line pairs between controller 20 and station controls are made possible by this invention so that relatively small diameter line pair wire, such as 20 or 22 gauge wire, may be used even for relatively long line pair lengths.

An important feature of this invention is that each station control is easily synchronized with controller 20 providing controller 20 with adequate response time between receiving data from and transmitting data to the station controls in order to perform its functions. Also each station control is capable of communication frame synchronization by virtue of the resetting function of each station control after a predetermined period of no clock pulses on the clock line pair. Another important feature of this invention is that each station control digitizes at the station control the information it has gathered for transmission to controller 20.

While there have been described above the principles of this invention in connection with specific embodiments, it is to be understood that this is by way of example and is not limiting of the scope of this invention.

What is claimed is:

1. Energy management control system apparatus comprising:
   a plurality of bit carrying communication lines;
   first means electrically coupled to said lines for transmitting serial clock bits having transition edges, transmitting first serial data bits and receiving second serial data bits;
   second means comprising a group of a plurality of stations, each of said stations electrically coupled to said lines at spaced points along said lines;
   control means at each of said stations electrically connected to said serial clock bits from said first means for performing a plurality of functions including the following functions;
   a first function of counting transition edges of said clock bits from said first means;
   a second function of providing an address count at said each station for each predetermined number of said edges and incrementing said address count by one for each of said predetermined number of said edges;
   a third function of providing a set address count increment for said each station, whereby each of said stations can be set to a different said increment than each of the other of said stations;
   a fourth function of transmitting and receiving serial information bits to said first means on said lines; and a fifth function of enabling said each station control means fourth function when said address count increment from said each control means second function matches said address count increment set in said third function for said each control means whereby said stations are placed in data communication with said first means in sequence without said first means providing address bits to selectively communicate data with said stations.

2. The apparatus of claim 1 wherein said plurality of lines comprises a first line pair for carrying said serial clock bits; a second line pair for carrying said fist serial data bits from said first means; and a third line pair for carrying said second serial data bits received by said first means; said each station control means receiving said clock bits on said first line pair, receiving said first data bits on said second line pair, and transmitting said second data bits on said third line pair.

3. The apparatus of claim 1 including energy means coupled to said first means at each of said stations for providing heating and cooling of a temperature controlled station zone at said each station and relay means for energizing and de-energizing said energy means.

4. The apparatus of claim 3 wherein said first means transmits said first serial bits representing a set point temperature to each said control for control of said energy means to control a station zone temperature.

5. The apparatus of claim 4 including temperature sensing means at each of said stations for sensing the station zone temperature at each of said stations;
said control means having a sixth function of providing said second serial bits representing said station zone temperature and transmitting said second serial bits to said first means.

6. The apparatus of claim 5 including condition sensing means at each said station for sensing the occurrence of a predetermined condition at each said station;
said control means including a seventh function of transmitting to said first means a digital bit indicating said predetermined condition has occurred since the last time a transmission occurred from each said station.

7. The apparatus of claim 6 wherein said predetermined condition is person occupancy of said station zone.

8. The apparatus of claim 6 wherein there are eight bits in said first serial bits, eight bits in said second serial bits and said first and second serial bits and said predetermined condition bit are serially transmitted between said first means and each of said control means at each of said stations.

9. The apparatus of claim 3 wherein said control means is coupled to said relay means and includes a sixth function of stalling data communication between said first means and said second mean, for resetting said counting of said transition edges to zero and resetting said address count to zero and for de-energizing said relay means to de-energize said energy means upon a failure of a predetermined communcation sequence.

10. The apparatus of claim 5 wherein said control means is coupled to said energy means and said temperature sensing means and includes a seventh function of sensing the temperature float direction at said each station zone and for controlling said energy means to heat or cool when the temperature float direction is down or up respectively.

11. The apparatus of claim 5 wherein said control means includes a seventh function of scaling a predetermined temperature range at the station zone at each of said stations for conversion to a predetermined number of digital bits.

12. The apparatus of claim 11 wherein said predetermined temperature range is 50° F.-90° F. and said predetermined number of bits is eight and said scaling and conversion is according to the formula:

$$N = 6.4(T - 50)$$

where $N = 8$ digital bits
and $T =$ sensed station zone temperature.

13. The apparatus of claim 6 wherein there are eight bits in said first serial bits and four bits in said second serial bits, and said first and second serial bits are serially transmitted between said first means and each of said stations.

14. The apparatus of claim 1 including measuring and conversion means at each said station for obtaining a measurement of a continusouly varying physical parameter at each said station;
said control means including a sixth function of converting at said each station said measurement to a digital number that is transmitted to said first means.

15. The apparatus of claim 1 including a plurality of said groups in said second means, each of said groups being coupled to said first means;
said first means for providing clock and data communcation with each of said groups concurrrently.

16. The apparatus of claim 1 wherein said control means includes a sixth function of resetting said counting of said transition edges to zero when said clocked bits are not received for a predetermined time period.

* * * * *